United States Patent
Ye et al.

(10) Patent No.: US 12,273,623 B2
(45) Date of Patent: Apr. 8, 2025

(54) HYBRID DYNAMIC VISION SENSOR AND CMOS DEVICE FOR MOTION COMPENSATION

(71) Applicant: Omnivision Technologies, Inc., Santa Clara, CA (US)

(72) Inventors: Yan Ye, Singapore (SG); Zhongyang Huang, Singapore (SG); Guansong Liu, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 224 days.

(21) Appl. No.: 17/394,944

(22) Filed: Aug. 5, 2021

(65) Prior Publication Data

US 2023/0042364 A1 Feb. 9, 2023

(51) Int. Cl.
*G06K 9/00* (2022.01)
*G06T 7/246* (2017.01)
(Continued)

(52) U.S. Cl.
CPC .......... *H04N 23/683* (2023.01); *G06T 7/248* (2017.01); *H04N 23/45* (2023.01); *H04N 23/6811* (2023.01); *G06T 2207/20016* (2013.01)

(58) Field of Classification Search
CPC .......... G06T 5/002; G06T 2207/20182; G06T 2207/20084; G06T 2207/20081; G06T 2207/20201; G06T 5/003; G06T 5/50; G06T 3/4069; G06T 2207/20021; G06T 2207/10141; G06T 3/4053; G06T 2207/10016; G06T 7/38; G06T 7/277;
(Continued)

(56) References Cited

U.S. PATENT DOCUMENTS

| 9,019,387 B2 | 4/2015 | Nakano |
| 2012/0236164 A1* | 9/2012 | Nakano ................. G06T 5/50 348/208.1 |

(Continued)

OTHER PUBLICATIONS

Zhengwei Ren, et al., "Electronic Image Stabilization Algorithm Based on Smoothing 3D Rotation Matrix", 2017 3$^{rd}$ IEEE International Conference on Computer and Communications, Changchun University of Science and Technology Changchun, China, pp. 2752-2755.

(Continued)

*Primary Examiner* — Gregory A Morse
*Assistant Examiner* — Owais Iqbal Memon
(74) *Attorney, Agent, or Firm* — MUNCY, GEISSLER, OLDS & LOWE, P.C.

(57) ABSTRACT

An image processing method and a device configured to implement the same are disclosed. The device comprises: a hybrid imaging device configured to obtain optical input; and a processing device in signal communication with the hybrid imaging device. The processing device comprises: a motion detection circuit that performs feature tracking based on a first component of an obtained optical input; a motion estimation circuit that performs motion compensation based on output of the motion detection unit; a frame reconstruction circuit that reconstructs image frame based on both the output of the motion estimation unit and a second component of the optical input; and an output unit that outputs image frame at a predetermined global frame rate.

17 Claims, 7 Drawing Sheets

(51) Int. Cl.
*H04N 23/45* (2023.01)
*H04N 23/68* (2023.01)

(58) Field of Classification Search
CPC ......... G06T 7/00; G06T 3/4038; H04N 19/51; H04N 19/527; H04N 23/681; H04N 23/81; H04N 23/71; H04N 19/513; H04N 23/00; G06V 10/16
See application file for complete search history.

(56) References Cited

U.S. PATENT DOCUMENTS

| | | | | |
|---|---|---|---|---|
| 2018/0098082 | A1* | 4/2018 | Burns | H04N 19/54 |
| 2019/0356849 | A1* | 11/2019 | Sapienza | H04N 23/684 |
| 2020/0084403 | A1* | 3/2020 | Suh | H04N 25/75 |
| 2021/0321052 | A1* | 10/2021 | Cossairt | G06T 1/0007 |
| 2023/0007207 | A1* | 1/2023 | Xiao | H04N 25/79 |
| 2023/0030562 | A1* | 2/2023 | Seo | H04N 23/683 |

OTHER PUBLICATIONS

Carlos Morimoto et al., "Fast Elecronic Digital Image Stabilization", Computer Vision Laboratory, Center for Automation Research, University of Maryland, College Park, MD, 20742, Conference Paper Sep. 1996, 6 pages.
Elias Mueggler et al., "Fast Event-based Corner Detection", Conference Paper Sep. 2017, 12 pages.
Guillermo Gallego et al., "Event-based Vision: A Survey", IEEE Transactions on Pattern Analysis and Machine Intelligence, Aug. 8, 2020, pp. 1-30.
Davide Scaramuzza, "Tutorial on Event-based Cameras:", University of Zurich, Institute of Informatics, Robotics & Perception Group, 2020, 113 pages.
Zihao W. Wang et al., "Event-driven Video Frame Synthesis", Northwestern University and Peking University, Jul. 6, 2019, pp. 1-10.

* cited by examiner

HYBRID DYNAMIC VISION SENSOR AND CMOS DEVICE FOR MOTION COMPENSATION

BACKGROUND

1. Technical Field

The present disclosure generally relates to image processing method and device implementing the same, and pertains more specifically to an image processing implementation that utilizes a hybrid imaging device having dual sensing element of distinct characteristics to achieve enhanced electronic image stabilization (EIS) accuracy while conserving power consumption.

2. Description of the Related Art

As mobile/portable imaging devices become proliferated in our modern daily life, demand for their image processing capabilities grows accordingly. Due to their mobile nature, the ability to handle undesirable motion (e.g., shaking/jittering) becomes one primary concern among device designers. Be it a hand-held portable camera for personal recreation or a vehicle-mounted image sensor module for self-driving applications, the accuracy of image stabilization and the computation efficiency of the image processing devices are both of paramount importance.

Image jittering problem caused by undesired camera shaking has been addressed both mechanically and electronically. For instance, by electronic image stabilization (EIS) approach, the quality of input video may be enhanced by removing the undesired sensor motions through software-based processing.

Techniques for electronic image stability may include frame-based motion compensation, which performs computation on sequence of standard intensity-based video frames. However, commonly-accessible imaging devices often only produce information with low temporal resolution, thus making the handling of excessive camera shaking a challenge. In addition, frame-based EIS often requires the processing of all pixels of all the captured frames even though no events may have happened for a majority of the frames. This consumes more power and requires longer processing time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
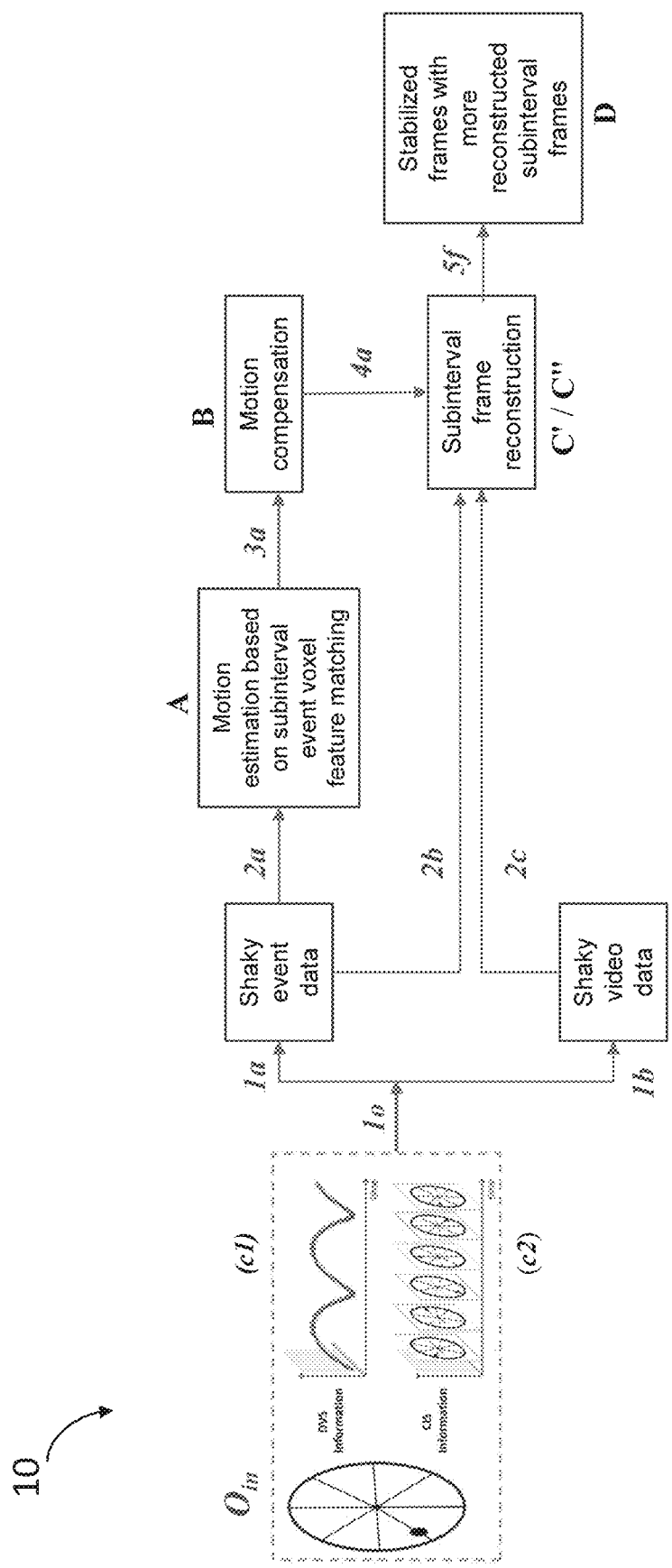
FIG. 1 shows a schematic illustration of an image processing implementation in accordance with some embodiments of the instant disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Video jittering problems caused by undesired camera shaking may be alleviated by mechanical arrangements (e.g., micro-electro mechanical systems, MEMS stabilizers) or Electronic Image Stabilization (EIS) approach. For instance, electrically controlled micro stabilizing mechanisms may be provided around an optical sensor component, such that a relative position of the sensor component (with respect an intended object to be captured) may be mechanically shifted (compensated) in a direction opposite to the direction of sensor displacement in an event of abrupt camera movement (e.g., shaking). Microscopic solid state devices (e.g., MEMS gyroscopes, accelerometers, motion dampers) fabricated through micro/nano lithography technical may be utilized in such implementations.

The target of electronic image stabilization (EIS), on the other hand, is to enhance the quality of input video by removing the undesired camera motions through software processing. The software-based motion compensation technique thus may achieve the goal of image compensation without the cost of additional hardware implementations.

Electronic image stabilization is often carried out based on intensity frames obtained from standard frame-based solid state image sensors (e.g., charged-coupled device/CCD, or CMOS image sensor/CIS). By way of example, a high speed shutter may be used to obtain a plurality of time-division image (frame stream) of an intended object. Through software-based processing, specific feature(s) of an object from the captured frame stream may be identified and used as reference(s) to synthesize compensated image frames. By way of example, motion compensation process may be realized by transforming an image frame with specific translation and rotation based on an acquired motion model. For instance, by applying intensity-based inter-frame feature extraction (e.g., corner detection from captured pixel frames) and intra-frame comparison techniques, corresponding motion vector(s) may be determined. The obtained motion vector (corresponding to an estimated camera movement at a respective time and frame) may then be used as a basis for camera shaking/video jittering compensation, thereby achieving electronic based image compensation. In such embodiments, stabilized video would maintain identical framerate as the original input video (e.g., from a CIS).

While modern solid state image sensors often possesses high spatial resolution (pixel density), the temporal resolution thereof may be limited (frame captured per unit time; e.g., 15-30 FPS). Thus, in some situations (e.g., extreme camera jittering), a motion model built upon motion vectors extracted from data of limited temporal resolution may be too coarse for accurate motion compensation. For instance, under a 30 FPS setting, the corresponding time interval between intensity frames would be about 33 milliseconds (ms). The performance of curve fitting operation for such a long time window may result in many information on the data curve to be considered as outliers. The accuracy of the final global motion estimation would thus be less than ideal.

This shortcoming may be alleviated through the use of higher intensity frame rate (e.g., increased FPS), but at the cost of higher computing resources and power consumption (not to mention the requirement for more expensive and specialized hardware equipment).

In contrast, event-based cameras (e.g., dynamic vision sensor, DVS) possess high temporal resolution (e.g., microsecond (μs) latency) yet limited pixel resolution. While this new breed of image sensor is still less commercially available, its high sensitivity to pixel level brightness changes enables the accurate capturing of (and thus accurate identification of) dynamic intra-frame changes in event-based data streams (event voxels). Nevertheless, the reconstruction of a DVS image (event frame) alone may only yield limited image quality due to the limited pixel resolution of DVS.

FIG. 1 shows a schematic illustration of an image processing implementation in accordance with some embodiments of the instant disclosure. By way of example, the illustrated image processing method comprises an electronic image stabilization (EIS) process capable of providing motion compensation for image capturing devices (e.g., mobile imaging equipment/hand-held devices). The image enhancement scheme of the exemplary EIS process may be applicable to either one or both the handling of still image and video streams.

Figure 6:
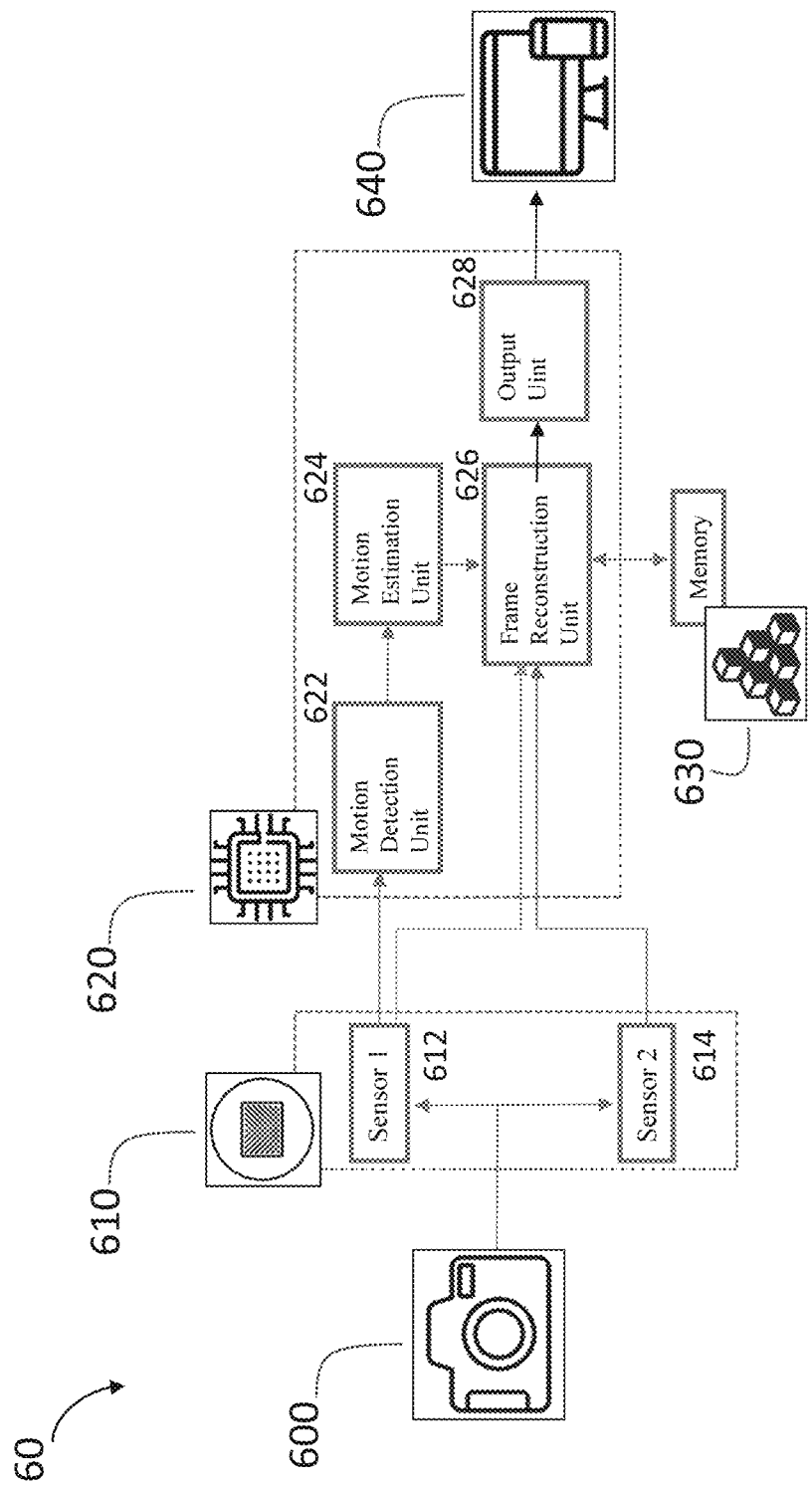
FIG. 6 shows a schematic component configuration of an image processing apparatus in accordance with some embodiments of the instant disclosure.

The exemplary image processing operation 10 begins from an initial stage of obtaining an optical input $O_{in}$ (e.g., a moving object such as a rotating bicycle wheel with a single reflector asymmetrically mounted thereon, as illustrated in FIG. 1) using an imaging device. An imaging device in accordance with the instant disclosure is provided with dual of sensing components (e.g., sensor elements 612, 614 as shown in FIG. 6) of distinct characteristics configured to concurrently capture two distinct components of the optical input $O_{in}$. For example, a hybrid imaging device that comprises an integrated first type sensor (responsive to a first optical component c1) and second type sensor (responsive to a second optical component c2) may be utilized for the obtaining of optical input $O_{in}$ (e.g., image processing device 600 illustrated in FIG. 6).

In typical embodiments, one of the two sensing components includes a standard frame-based camera (e.g., having CCD or CIS components) capable of obtaining frame-based image data with high pixel resolution (e.g., 1920×1080 or higher). For the context of the instant disclosure, frame-based image data generally refers to a captured optical input component that is depicted in absolute intensity measurement. The frame-based image component of the optical input $O_{in}$ may be referred to as an active pixel sensor (APS) frame, which is characterized by its relatively low frame rate (e.g., more than 5 ms latency). As such, the frame-based sensor component is characterized in their ability to obtain image data with high spatial (pixel) resolution yet at a lower temporal resolution (frame rate per unit time). This makes the frame-based camera inherently prone to motion blur when recording highly dynamic scenes. For one thing, since standard cameras produce frames with relatively low temporal information, it presents a challenge to handle extreme camera shaking as a final global motion estimation based thereon would not be accurate enough. In addition, higher power consumption and longer processing time would be required.

While the spatial resolution capability from a standard frame-based camera is essential to the generation of high quality images, embodiments of the instant disclosure simultaneously incorporates the other type of optical sensor that possesses inherently distinct characteristics of operation as a complementary measure for accurate yet efficient motion compensation. In some embodiments, the other type of sensor may include an event-based camera that is characterized in its significantly higher sensitivity to a second component of the optical input $O_{in}$ over the standard frame-based sensor components.

The working principle of an event-based cameras (such as a Dynamic Vision Sensor, DVS) is quite different from a traditional frame-based camera. The event cameras employ independent pixels that only generate information referred to as "event(s)" in the presence of a brightness change in the scene at a precise moment of such occurrence. Accordingly, the output of an event sensor is not an intensity image but a stream of asynchronous events recorded in high definition temporal resolution (e.g. microsecond), where each event comprises the time at which it is recorded and a position (or an address) of the respective pixel that detected the brightness change, as well as the polarity of the brightness change (binary intensity change in positive or negative signs).

Since the event generation is induced by brightness changes over time, an event camera is inherently responsive to the detection of edges in a scene in the presence of relative motion. Thus, event cameras offer certain characteristics over standard frame-based cameras, particularly in aspects such as substantially lower latency (in the order of microseconds), low power consumption, and substantially higher dynamic range (e.g., 130 dB compared to 60 dB of standard, frame-based cameras). More importantly, since the pixels of the event sensor are independent, such sensors are inherently immune to motion blurring issue.

In the illustrated embodiment, a first type sensor (which corresponds to the event-based component c1 of the optical input $O_{in}$) is provided with a first pixel resolution and a first temporal resolution. On the other hand, a second type sensor (which corresponds to the frame-based component c2 of the optical input $O_{in}$) is provided with a second pixel resolution that is greater than the first pixel resolution and a second temporal resolution less than the first temporal resolution. It is noted that, depending on operating conditions and application requirements, other types of sensors may be integrated in the hybrid imaging device to augment the frame-based sensor elements. For one thing, a hybrid imaging device that integrates different types of sensor components with distinct characteristics may enable enhanced imaging processing capabilities suitable for a particular ambient condition or type of application. In some embodiments, a hybrid imaging device may comprise a combination of different types of sensor components, which may include, e.g., standard frame-based camera components, high speed camera components, spike sensor, structured light sensor, event sensor components, ultrasound imaging components, infrared imaging components, laser imaging components, etc.

A combination of the two types of sensor elements from the hybrid imaging device enables the recording of two distinct components of the obtained optical input $O_{in}$. For instance, as illustrated in the embodiment of FIG. 1, component c1 and component c2 of the optical input $O_{in}$ of a moving wheel (with an asymmetrically mounted reflector) are simultaneously obtained by the hybrid imaging device at the initial stage of the exemplary process.

Among them, component c2 corresponds to a data stream of high pixel resolution frames at a relatively low update frequency (e.g., 30 fps). Without relative motion between the captured object and the edges of an image frame (e.g., under stable camera operation), the optical component c2 from a standard frame-based sensing component (e.g., sensor 614 shown in FIG. 6) may be presented by a highly redundant image frame stream with noticeable gaps therebetween along the horizontal/time axis, as shown in FIG. 1.

On the other hand, component c1 corresponds to the event-based voxel data (which reflects only the relative movement path of the asymmetric wheel reflector at a significantly higher update rate along the horizontal/time axis) from a complementary event-based sensing component (e.g., sensor 612 shown in FIG. 6).

The obtained optical input $O_{in}$ may comprise an image data stream that includes steady image data (e.g., captured by a camera under tranquil conditions, which may be perfectly comprehensible by an image processing system configured at an economical regular/relatively low global frame rate) as well as shaky ones (e.g., outlier frames caused by excessive camera shaking, which resulted in image jittering problem incomprehensible for the processing system under regular settings). Unlike certain video compensation techniques where the frame-based optical component c2 is utilized directly for shaky frame recognition and motion compensation, the image stabilization implementation of the instant disclosure employs a different approach depicted as follows.

As illustrated in the embodiment of FIG. 1, the general process of an event-based video stabilization starts with simultaneously capturing high temporal event data (including the outlier, shaky event data) and its corresponding standard temporal video frames (e.g., shaking video data). Following the initial input obtaining stage at processing path 1o, the distinct components of the obtained optical input $O_{in}$ are split (e.g., into processing paths 1a and 1b) and processed separately.

In the exemplary embodiment, the event data recorded by the event-based sensor components plays two roles in the overall process. Firstly, the event data is utilized for camera motion estimation (following processing path 2a to path 3a). For one thing, in accordance with the event-based video stabilization process of the instant disclosure, the frame-based information (e.g., optical component c2) is not taken into consideration in the motion estimation process. In other words, camera motion estimation relies substantially on the event data component c1. Compared with a frame-based intra-frame feature recognition process, using only event data for motion estimation process helps to conserve computing resources (e.g., operation C' following the current path 2a).

Secondly, the event-based data may be utilized for sub-interval frame construction, which will be described a later section (e.g., operation C" following processing path 2b).

Figure 2:
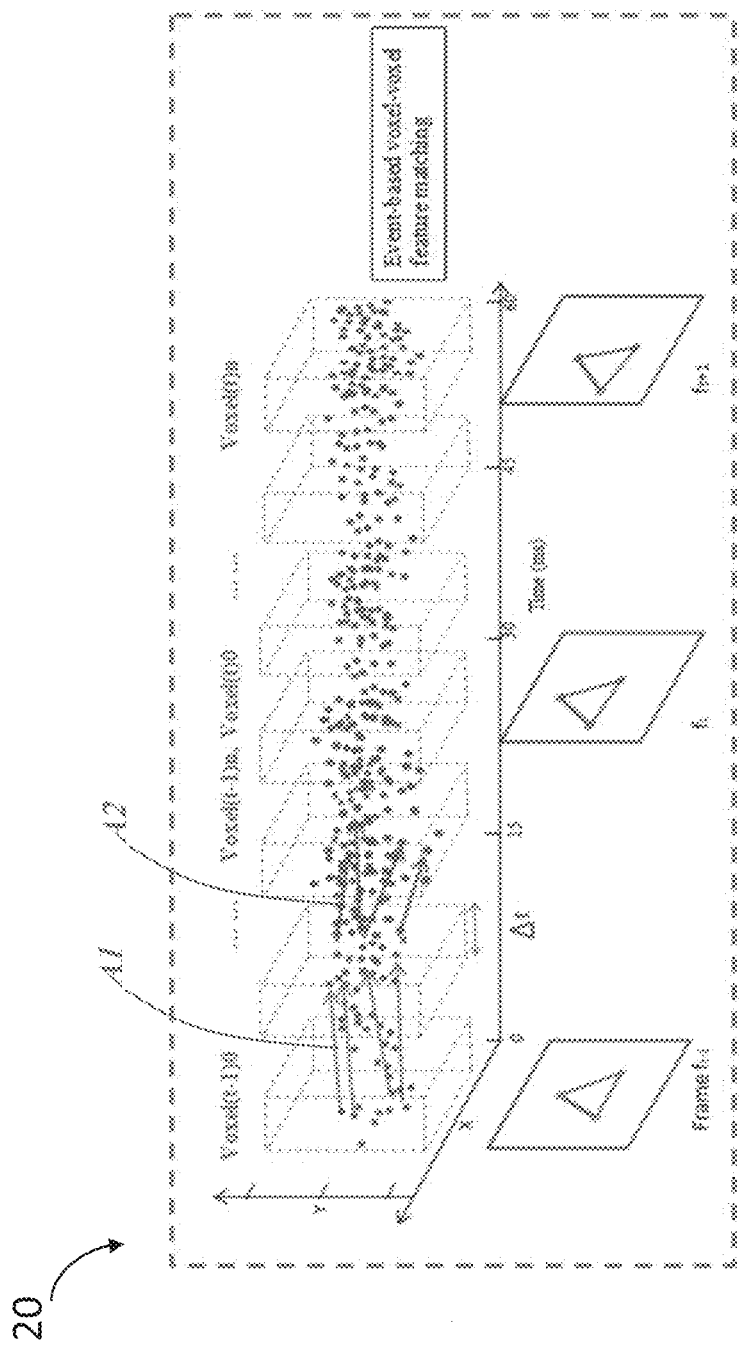
FIG. 2 shows a schematic image processing operation in accordance with some embodiments of the instant disclosure.

Refer concurrently to FIG. 2, which shows a schematic image processing operation in accordance with some embodiments of the instant disclosure. Particularly, FIG. 2 schematically shows an exemplary feature tracking operation 20 that may correspond to operation A illustrated in FIG. 1. For instance, following processing path 2a, a feature extraction and matching operation is performed based on the first component c1 (the event-based component) of the optical input $O_{in}$.

As demonstrated in FIG. 2, the dots occupying the 3D temporal and spatial space represent events that are detected by the event-based sensor component of the hybrid imaging device. Particularly, the denser dot distribution occurs around the middle intensity frame $f_t$ may reflect the detection of undesired camera motion due to camera shaking. At the bottom of the figure, there are three standard frames $f_{t-1}$, $f_t$, and $f_{t+1}$ recorded under a standard global frame rate setting at time 0 ms, 30 ms and 60 ms, respectively. In the instant embodiment, the standard intensity-based frames are shown here only for reference, and not for the camera motion estimation.

As shown in FIG. 2, lots of events are captured between frames $f_{t-1}$ and $f_t$ (hence the noticeable increase of dot density). By defining a time window $\Delta t$ (e.g., a subinterval within a standard global interval of 30 ms), the events happened in this time window may be configured to form an event frame (voxel).

For instance, events from the first component c1 of an optical input $O_{in}$ are captured and accumulated into a first event frame. An image processing system (e.g., system 60 as shown in FIG. 6) may be configured to predefine how asynchronous event frames are to be generated (e.g., by defining a suitable subinterval duration, which is equal to or shorter than the global standard output interval). The sub-interval may be preset based on factors such as the type of sensor, the number of image sensing elements in the sensor (e.g., referred to as "event pixels"), desired latency and accuracy, and the type of environment the image processing system is being operated in, etc.

In some scenarios, a subinterval may be set to equal the standard global interval (e.g., when it is determined that the system is operated under a relatively steady condition) to conserve computational recourses (e.g., save power). In other cases, the subinterval may be set to be very small (e.g., microsecond) to ensure the performance of motion compensation under harsh operating conditions (e.g., excessive shaking). Each event may be defined as an intensity change above a threshold for a single event pixel, or for a predefined batch of spatially proximate pixels. As shown in FIG. 2, the exemplary embodiment shows (n+1) event voxels between frames $f_{t-t}$ and $f_t$ (e.g., from Voxel(t)0 to Voxel(t)n between each standard frame interval of 30 ms).

As can be noticed from the exemplary embodiment, during steady camera operations, the recorded event voxels may be relatively still (with fewer pixel level intensity changes/lower dot density). However, owing to the significantly higher temporal resolution of the first type sensing element (e.g., DVS), during undesirable camera shaking, the generated event frequency (temporal resolution) by the event-based sensor components may be substantially higher than the global frame-based image frequency from a standard image sensor component.

The undesired camera motions cause intensity change at pixel-levels, and the change is represented as an event dot. The exemplary feature tracking process (e.g., operation A) continues to find meaningful features on the event voxels. For instance, in an event frame, a feature such as a corner of an edge of a captured object may be identified by a group of spatially proximate event dots. For example, a feature may be identified as a set of dots in an event frame that form a particular shape. In some embodiments, feature identification may be performed through a pattern detection algorithm such as Harris corner detector.

In the schematic illustration, the event-based video stabilization process first looks for features based on the events data (e.g., identify/extract features within an event frame (voxel), where each dot already represent the occurrence of an event). The process then seeks the correspondence of these features between successive event voxels (e.g., match/track feature change with time in a successive event voxel stream), so as to determine motion vector(s) with increased accuracy. For example, the tracking arrows A1 and A2 shown in FIG. 2 represent the feature matching process between successive voxels.

The feature matching process intends to find the corresponding feature points happened in the current voxel and its successive voxel, and subsequently transforming this correspondence to a motion model. Thanks to the greater temporal resolution of the event-based data stream, the motion model thus generated may be more accurate and refined.

Figure 3:
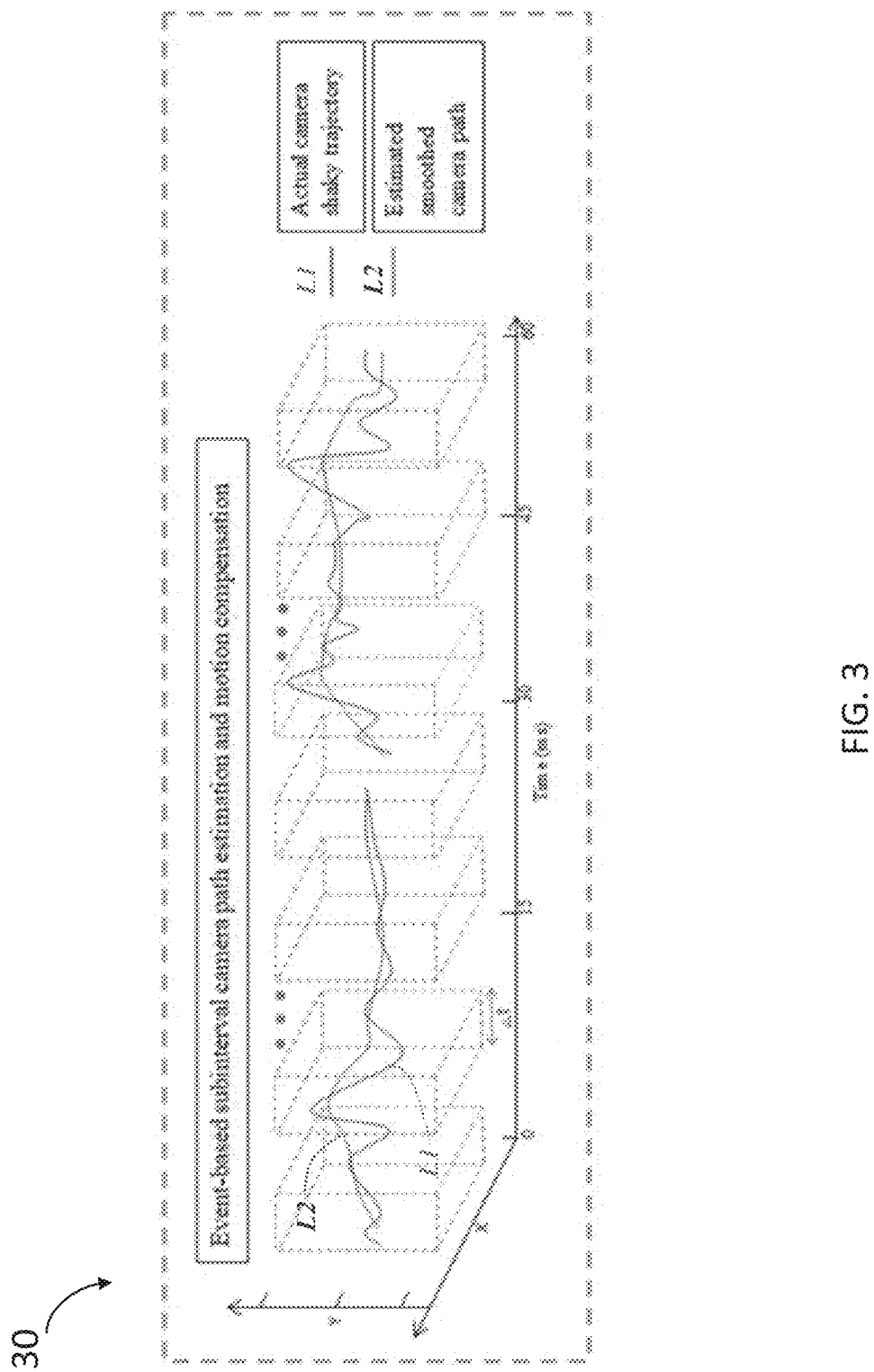
FIG. 3 shows a schematic image processing operation in accordance with some embodiments of the instant disclosure.

Referring concurrently to FIG. 3, which shows a schematic image processing operation in accordance with some embodiments of the instant disclosure. Particularly, FIG. 3 schematically shows an exemplary motion compensation process 30 that may correspond to operation B illustrated in FIG. 1. For instance, following the processing path 3a in the illustrated embodiment, a motion compensation operation is performed based on the first component c1 (the event-based component) of the obtained optical input $O_{in}$.

Particularly, the exemplary embodiment of FIG. 3 illustrates an event-based subinterval camera path estimation and motion compensation operation. Since the voxel to voxel time window may be short in the order of microseconds, the actual camera shaky trajectory (e.g., the spiky curve L1 shown in FIG. 3) may be smoothened segment by segment for each subinterval time window $\Delta t$. Accordingly, the feature correspondence found in the preceding feature matching process (e.g., operation A) enables the formation of a refined motion model, which in turn translates to a further smoothened estimated motion path, as schematically illustrated by the smoother curve L2 shown in FIG. 3.

If considering the motion estimation operation as a curve fitting process, in the illustrated embodiment, most of the information on the original curve L1 would be considered. Accordingly, there would be fewer outliers from the recorded data stream. In other words, with the increase of sampling/data points during a curve fitting process, the number of outliers would be reduced. Therefore, the result of the curve fitting operation may be more accurate and reliable, which means the final global motion estimation may be more refined and precise.

Following the processing path 4a, the outcome of the motion estimation process from operation B may be applied in a subsequent frame reconstruction operation to generate corrected image frames, e.g., to substitute for the outlier frames that are deemed uncomprehensive due to excessive jittering (e.g., frame $f_t$ as shown in FIG. 2).

By way of example, in a subsequent frame reconstruction operation (operation C'), both the result of the motion compensation process (which is based on the event-based first component c1) and the frame-based second component c2 of the optical input $O_{in}$ are utilized to reconstruct motion-compensated image frames (e.g., stabilized frames) with enhanced accuracy.

Figure 5:
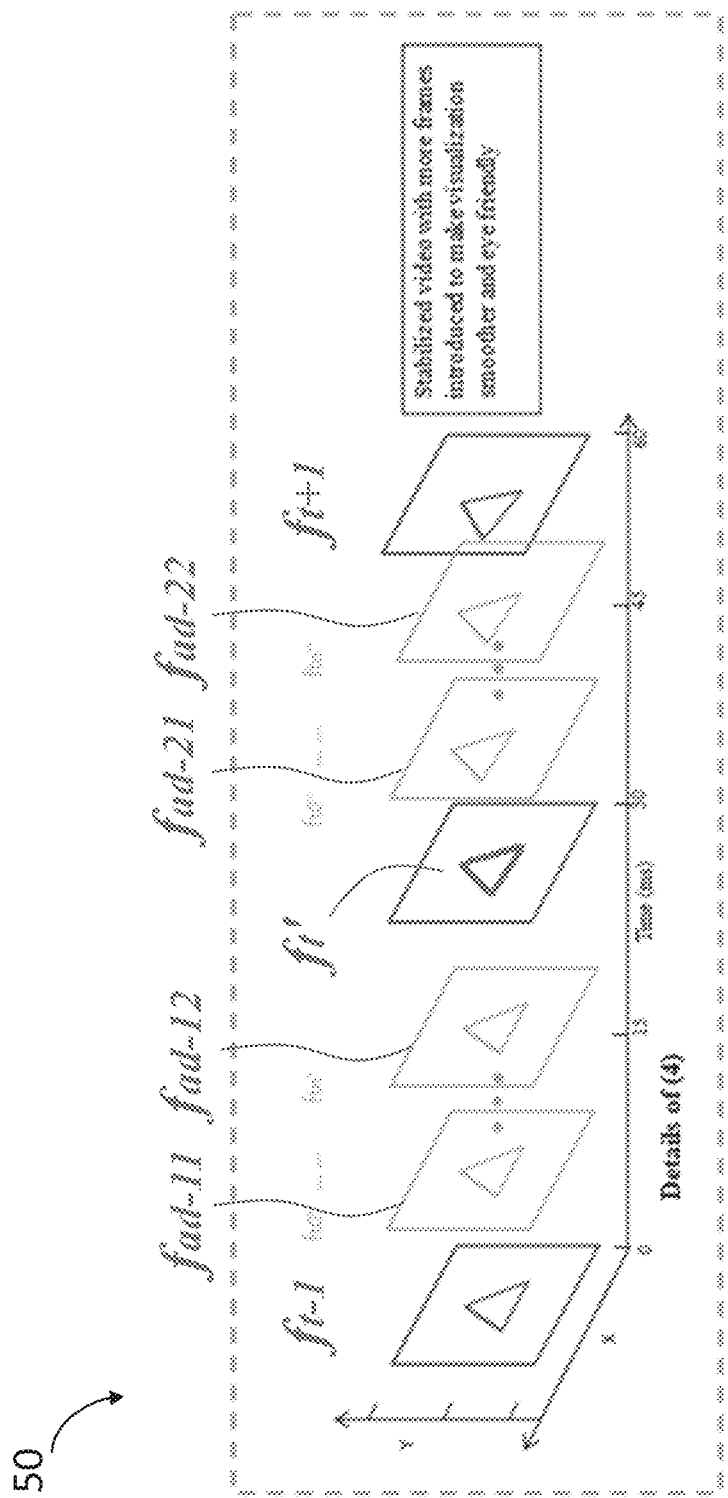
FIG. 5 shows a schematic image processing operation in accordance with some embodiments of the instant disclosure.

For instance, in the illustrated embodiment, the frame-based component c2 of the optical input $O_{in}$ (having higher pixel resolution) is used as a base reference for frame reconstruction, while the motion model information from the preceding compensation process (e.g., operation C') is incorporated thereto (upon spatial and temporal synchronization) to enable the generation of reconstructed image frames with refined accuracy. Accordingly, an adjusted intensity frame (e.g., $f_t'$ as shown in FIG. 5, may correspond to an original outlier frame $f_t$ shown in FIG. 2) may be generated as replacement for an incomprehensibly shaken frame.

The image processing implementation then proceeds to processing path 5f, in which stabilized image frames may be outputted to a display device at a predetermined global frame rate (e.g., identical to the standard global frame rate shown in FIG. 2).

Figure 4:
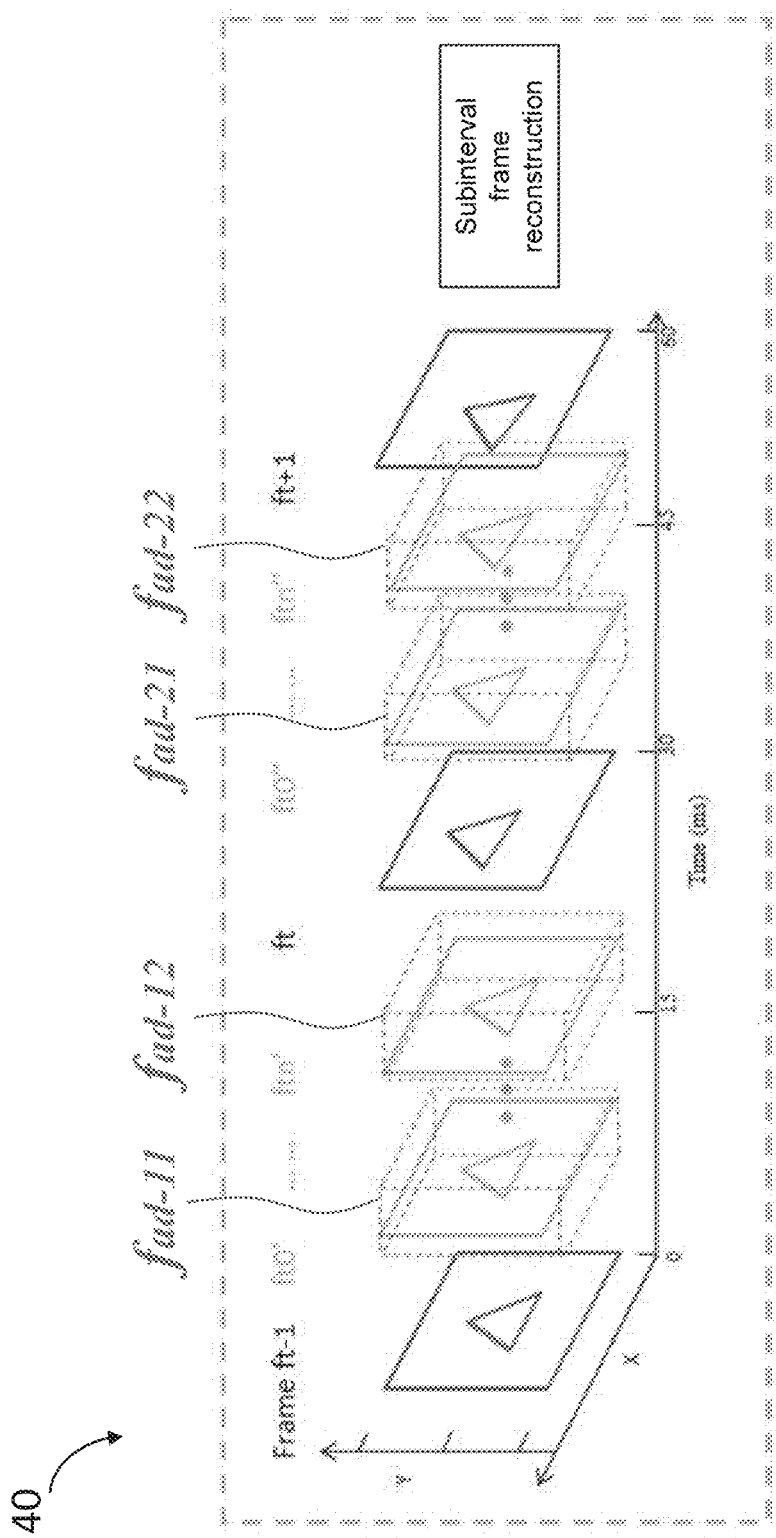
FIG. 4 shows a schematic image processing operation in accordance with some embodiments of the instant disclosure.

Referring concurrently to FIG. 4, which shows a schematic image processing operation in accordance with some embodiments of the instant disclosure. Particularly, FIG. 4 schematically shows an exemplary frame construction process 40 that may correspond to operation C" illustrated in FIG. 1.

In the exemplary operation, both components c1 and c2 of the optical input are taken into consideration (as represented by the merging of processing paths 2b and 2c), and the implementation proceeds to path 5f where a subinterval frame construction operation is performed. In the exemplary embodiment, additional image frames based on both the subinterval event-based voxel data and the frame-based image data are actively constructed, such that the implementation in accordance with the instant disclosure may selectively increasing local frame rate output by inserting the additionally synthesized image frames between the reconstructed image frames, thereby generating a local output frame rate greater than the standard global frame rate.

Particularly, the exemplary embodiment of FIG. 4 illustrates a subinterval frame reconstruction operation, in which active construction and insertion of additional image frames are selectively performed for data stream segments that are deemed uncomprehensive due to excessive camera jittering (e.g., between frames $f_{t-1}$ and $f_t$, as well as between frames $f_t$ and $f_{t+1}$).

Embodiments in accordance with the instant disclosure forms subinterval reconstructed frames for more refined and reliable camera motion compensation. During the subinterval frame synthesis process, both event data and video frames are utilized. In some embodiments, the performance of subinterval frame reconstruction may be performed by utilizing a convolutional neural network (CNN), which takes in high resolution temporal event data and (synchronized with) the corresponding simultaneously acquired high pixel resolution image frames to synthesize high quality, high frame rate video. As illustrated in FIG. 4, theoretically, each event voxel may be transformed into an additional reconstructed intensity frame (e.g., subinterval frames $f_{ad-11}$, $f_{ad-12}$, $f_{ad-21}$, and $f_{ad-22}$).

Referring concurrently to FIG. 5, which shows a schematic image processing operation in accordance with some embodiments of the instant disclosure. Particularly, FIG. 5 schematically shows an exemplary frame output process 50 that may correspond to operation D as illustrated in FIG. 1.

The exemplary illustration of FIG. 5 shows the output of stabilized video data with additionally synthesized frames inserted between the standard interval frames (e.g., the initial reference frame $f_{t-1}$ and the motion-compensated frame $f_t'$) at time interval from 0ms to 30 ms (e.g., $f_{ad-11}$ and $f_{ad-12}$) and 30 ms to 60 ms (e.g., $f_{ad-21}$ and $f_{ad-22}$). This may be done by applying the fine-grained motion compensation not only on the original intensity frames $f_{t-1}$, $f_t$, and $f_{t+1}$, but also on all the reconstructed subinterval frames $f_{ad-11}$, $f_{ad-12}$, $f_{ad-21}$, and $f_{ad-22}$. The final stabilized video stream is therefore provided with an increased local framerate. Selectively increasing local frame rate around an originally shaky outlier frame (e.g., $f_t$) makes visualization of the final stabilized video smoother and more eye friendly (especially if the increased local frame rate output does not exceed/is supported by a playback hardware).

The preceding embodiments in accordance with the instant disclosure may be implemented in hardware, firmware or via the use of software or computer code capable of being stored in a recording medium such as a CD ROM, RAM, a floppy disk, a hard drive, a magneto-optical disk, downloadable computer code over a data network stored in a remote recording medium, or a non-transitory machine readable medium and to be stored on a local recording medium. In some embodiments, the image processing method described herein may be rendered using such software stored on a recording medium using a general purpose computer, an application specific processor, or in programmable or dedicated hardware, such as an ASIC or FPGA. As would be understood in the art, the computer, the processor, microprocessor controller, or the programmable hardware may include memory components, e.g., RAM, ROM, Flash, etc., which may be used to store or receive software or computer code such that, when accessed and executed by the computing device, causes the processor or hardware implement to perform the processing methods described herein. Moreover, it would be recognized that when a general purpose computer accesses code for implementing the processing shown herein, the execution of the code transforms the general purpose computer into a special purpose computer for executing the processing described herein.

FIG. 6 shows a schematic component configuration of an image processing system in accordance with some embodiments of the instant disclosure. By way of example, the exemplary image processing system may be employed to carry out the image processing implementation in accordance with the instant disclosure, as discussed in the previous embodiments.

The exemplary image processing system comprises a camera 600 that incorporates a hybrid imaging device 610, which comprises a first type sensor 612 and a second type sensor 614. Among them, the first type sensor 612 is configured to be sensitive to a first component (e.g., c1 as shown in FIG. 1) of an obtained optical input (e.g., $O_{in}$ as shown in FIG. 1), while the second type sensor 614 is configured to be responsive to a second component (e.g., c2 as shown in FIG. 1) of a captured input.

The camera 600 further comprises a processing device 620 arranged in signal communication with the hybrid imaging device 610, configured to receive and process the output from both the first and the second type sensors 612, 614. In some embodiments, the processing device 620 may a processer included as a part of an integrated circuit, which comprises various circuits, each for performing a particular function as depicted in the previous embodiments.

In the illustrated embodiment, the exemplary processing device 620 is provided with a motion detection unit 622, which may contain necessary hardware circuitry, software, or firmware components to perform feature tracking (e.g., operation A as illustrated in FIG. 1) based on the first component of an obtained optical input. The processing device 620 further provided with a motion estimate unit 624 arranged downstream of the motion detection unit 622, which may incorporate necessary hardware circuitry, software, and firmware components to perform motion compensation (e.g., operation B as illustrated in FIG. 1) based on output from the motion detection unit 622.

A frame reconstruction unit 626 is provided downstream of the motion estimation unit 624, as well as configured to respectively receive inputs from both the first and the second type sensors 612, 614. The frame reconstruction unit 626 may incorporate necessary hardware circuitry, software, and firmware components to perform reconstruction of image frames (e.g., operation C' as illustrated in FIG. 1) based on both the outputs from the motion estimation unit 624 and the second component of the optical input from the second type sensor 614. In the illustrated embodiment, the frame reconstruction unit 626 is further configured to construct additional image frame based on both the event-based voxel data and the frame-based image data; and selectively increase local frame rate output by inserting the additional image frame between reconstructed image frames to generate a local output frame rate greater than the global frame rate (e.g., operation C" as illustrated in FIG. 1). In some embodiments, the frame reconstruction unit 626 may be further configured to perform pixel synchronization and temporal synchronization between the first component and the second component of an obtained optical input.

An output unit 628 is provided downstream of the frame reconstruction unit 626, which may incorporate necessary hardware, software, and firmware components to enable output of image frames at a predetermined global frame rate, as well as allowing selective output of locally increased frame rate optionally generated by the frame reconstruction unit 626 (e.g., operation D as illustrated in FIG. 1). A display 640, which may be a stationary or a mobile device, is signal communicatively coupled to the processing device 620 for displaying the image or video output.

It is noted that each of the various functional units/circuits 622, 624, 626, and 628 of the processing device 620 may be formed by common or different circuitry within a processing unit, and configured to execute program instructions read from a memory 630 coupled thereto. For instance, the memory 630 may be used by one or more of the shown circuits of the processing device 620 for interim storage during calculations, and for storing computed data. The memory 630 may also store program instructions read and executed by the processing device 620 to carry out its operations.

Depending on application, the processing device 620 may be implemented as a multi-functional computing hardware or an application specific hardware. For example, applicable types of processing devices may include central processing unit (CPU), digital signal processor (DSP), image signal processor (ISP), etc. In some embodiments, a processor may include a multi-core processor that contains multiple processing cores in a computing device. In some embodiments, various elements associated with the processing device 620 may be shared by other devices.

In some embodiments, the first type sensor 612 comprises an event-based optical sensor, and the first component of the optical input comprises event-based voxel data (e.g., component c1). In some embodiments, the second type sensor 614 comprises a frame-based optical sensor, and the second component of the optical input comprises frame-based image data (e.g., c2). In some embodiments, the first type sensor has a first pixel resolution and a first temporal resolution, while the second type sensor has a second pixel resolution greater than the first pixel resolution and a second temporal resolution less than the first temporal resolution.

Figure 7:
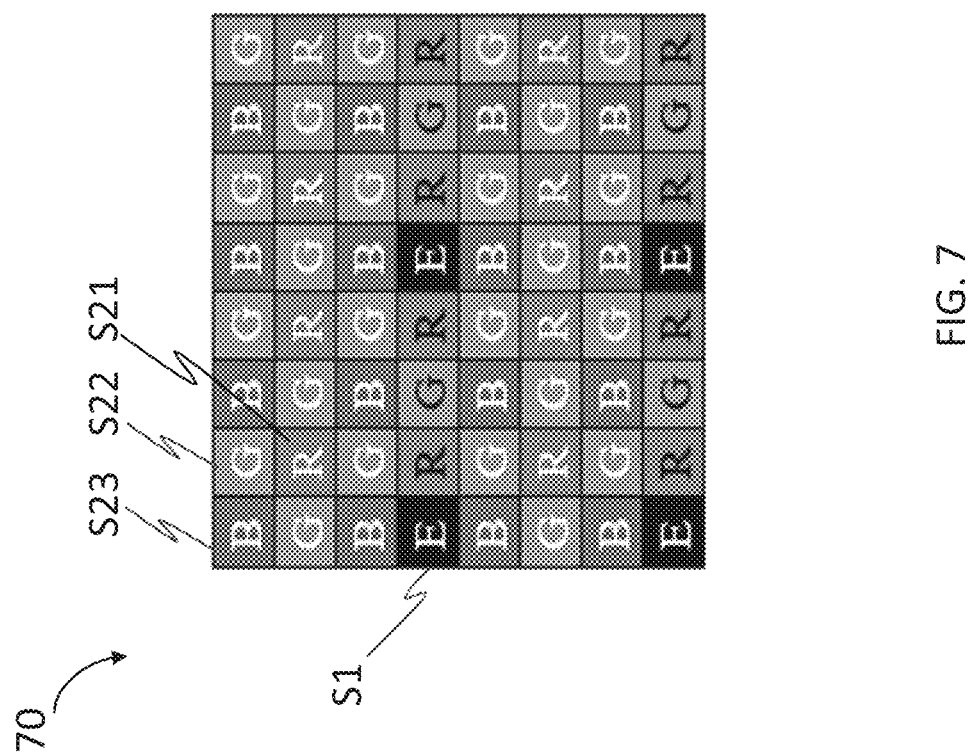
FIG. 7 shows a schematic illustration of a hybrid imaging device in accordance with some embodiments of the instant disclosure.

FIG. 7 shows a schematic illustration of a hybrid imaging device in accordance with some embodiments of the instant disclosure. By way of example, in some embodiments, a hybrid imaging device comprises a fusion image sensor chip that incorporates both CMOS elements and DVS elements on a common sensing interface.

For instance, FIG. 7 shows a schematic sensor component layout for a hybrid imaging device 70 that comprises a plurality of first type sensor cells S1 and a plurality of second type sensor cells S21, S22, S23 collectively arranged in an interleaving matrix pattern. In the illustrated embodiment, the second type sensor cells S21, S22, S23 correspond respectively to the red R, green G, and blue B subpixels of a CMOS image sensor, while the first type sensor cells S1 correspond to an array of dynamic vision sensor (DVS) cells, which are inserted interleavingly among the second type sensor cells.

For such an embodiment, because motion related information is only generated in the presences of brightness changes for the event-based DVS cells (e.g., cells S1), the exemplary hybrid imaging device 70 may remove the inherent redundancy of a standard frame-based sensor cells (e.g., S21, S22, S23), thereby requiring a substantially lower data rate.

For instance, the output of the event-based sensor cell (e.g., S1) is not an intensity image but a stream of asynchronous events at microsecond resolution. Thus, each event data generated there-by comprises an associated space-time coordinate and a sign of corresponding brightens change (positive or negative, without intensity information).

Moreover, as the event-based sensor possesses spontaneous sensitivity toward the triggering of an event, an event frame generated there-by may represent events captured within a fraction of a millisecond. Thus, an event voxel may form a sparsely populated type of edge map, in which only areas that are informative for motion stabilization are processed while other areas may be discarded without any computation. Therefore, the event-based sensor allows triggering of system processing only when sufficient event data are accumulated (e.g., more events may be triggered when heavy camera jittering occurs). When there is less movement in the camera device, fewer event frames would be generated (and thus less computation would be performed), thereby conserving power and processing resources.

Furthermore, because events are triggered by brightness changes over time, the event-based sensor component possesses an inherent response sensitivity toward corners or edges in a scene with presences of relative motion, thereby enabling the generation of motion estimation with enhanced accuracy.

Nevertheless, as discussed previously, depending on specific application environment and operating requirements, other types of sensor components possessing distinct respond characteristics toward optical inputs may be utilized in a hybrid imaging device without departing from the spirit of the instant disclosure.

Accordingly, one aspect of the instant disclosure provides a method of image processing, which comprises: obtaining optical input by a hybrid imaging device; performing feature extraction and matching based on a first component of an obtained optical input; performing motion compensation based on the first component of the obtained optical input; reconstructing image frame based on both an output of the motion compensation process and a second component of the optical input; and outputting image frame to a display device at a predetermined global frame rate.

In some embodiments, the obtaining of optical input by a hybrid image device comprises acquiring optical input by a hybrid imaging device that comprises integrated first type sensor and second type sensor; wherein the first component of the optical input corresponds to the first type sensor; and wherein the second component of the optical input corresponds to the second type sensor In some embodiments, the first type sensor has a first pixel resolution and a first temporal resolution; wherein the second type sensor has a second pixel resolution greater than the first pixel resolution and a second temporal resolution less than the first temporal resolution.

In some embodiments, the first type sensor comprises dynamic vision sensor (DVS); and the second type sensor comprises CMOS image sensor (CIS).

In some embodiments, the first type sensor comprises an event-based optical sensor, and the first component of the optical input comprises event-based voxel data;

In some embodiments, the second type sensor comprises a frame-based optical sensor, and the second component of the optical input comprises frame-based image data.

In some embodiments, the method further comprises: constructing additional image frame based on both the event-based voxel data and the frame-based image data; and selectively increasing local frame rate by inserting the additional image frame between reconstructed image frames to generate a local output frame rate greater than the global frame rate.

In some embodiments, the performing of feature extraction and matching comprises determining, by a motion detection circuit, a motion vector via feature extraction and inter-frame matching on the event-based voxel data.

In some embodiments, the performing of motion compensation comprises generating, by a motion estimation circuit, a motion model based on the motion vector from the feature extraction and matching process.

In some embodiments, the reconstructing of image frame comprising performing, by a frame reconstruction circuit, both spatial synchronization and temporal synchronization of the processed first component and the frame-based second component of the optical input.

Accordingly, another aspect of the instant disclosure provides an image processing apparatus, which comprises: a hybrid imaging device configured to obtain optical input; and a processing device in signal communication with the hybrid imaging device, comprising: a motion detection unit that performs feature tracking based on a first component of an obtained optical input; a motion estimation unit that performs motion compensation based on output of the motion detection unit; a frame reconstruction unit that reconstructs image frame based on both the output of the motion estimation unit and a second component of the optical input; and an output unit that outputs image frame at a predetermined global frame rate.

In some embodiments, the hybrid imaging device comprises integrated first type sensor and second type sensor; wherein the first component of the optical input corresponds to the first type sensor; wherein the second component of the optical input corresponds to the second type sensor.

In some embodiments, the frame reconstruction unit is configured to respectively receive both the first component of the optical input from the first type sensor and the second component of the optical input from the second type sensor.

In some embodiments, the first type sensor has a first pixel resolution and a first temporal resolution; the second type sensor has a second pixel resolution greater than the first pixel resolution and a second temporal resolution less than the first temporal resolution.

In some embodiments, the second type sensor comprises an array of CMOS image sensor (CIS) cells; and the first type sensor comprises an array of dynamic vision sensor (DVS) cells interleavingly inserted among the CIS cells.

In some embodiments, the first type sensor comprises an event-based optical sensor, and the first component of the optical input comprises event-based voxel data;

In some embodiments, the second type sensor comprises a frame-based optical sensor, and the second component of the optical input comprises frame-based image data.

In some embodiments, the frame reconstruction unit is further configured to: construct additional image frame based on both the event-based voxel data and the frame-based image data; and selectively increase local frame rate output by inserting the additional image frame between reconstructed image frames to generate a local output frame rate greater than the global frame rate.

In some embodiments, the motion detection unit is configured to determine a motion vector via feature extraction and inter-frame on the event-based voxel data; and the motion estimation unit is configured to generate a motion model based on the motion vector.

In some embodiments, the frame reconstruction unit is configured to perform both pixel synchronization and temporal synchronization between the event-based first component and the frame-based second component of the optical input.

Accordingly, one aspect of the instant disclosure provides an image processing system, which comprises: an image signal processor (ISP) configured to receive optical input from a hybrid imaging device, the optical input having a first component that comprises event-based voxel data and a second component that comprises frame-based image data; and a memory coupled to the ISP comprising instructions that, when executed by the ISP, causing the ISP to: perform feature tracking based on a first component of an obtained optical input; perform motion compensation based on output of the motion detection unit; reconstruct image frame based on both the output of the motion estimation unit and a second component of the optical input; and output image frame to a display device at a predetermined global frame rate.

In some embodiments, the ISP is configured to perform image frame reconstruction by synchronizing the first component of the optical input from the first type sensor and the second component of the optical input from the second type sensor.

In some embodiments, the ISP is further configured to perform frame reconstruction by: constructing additional image frame based on both the event-based voxel data and the frame-based image data; and selectively increasing local frame rate output by inserting the additional image frame between reconstructed image frames to generate a local output frame rate greater than the global frame rate.

Those skilled in the art will readily observe that numerous modifications and alterations of the device and method may be made while retaining the teachings of the instant disclosure. Accordingly, the above disclosure should be construed as limited only by the metes and bounds of the appended claims.

What is claimed is:

1. A method of image processing, comprising:
simultaneously obtaining a first component and a second component of an optical input by a hybrid imaging device comprising a first type sensor and a second type sensor, wherein the first component of the optical input corresponds to the first type sensor and the second component of the optical input corresponds to the second type sensor;
performing feature extraction and matching based on the first component of the optical input, and identifying steady image data and shaky image data from the optical input based on intensity change at pixel-levels of the first component of the optical input;
performing motion compensation on the first component of the optical input;
reconstructing a plurality of image frames based on both the motion compensated first component of the optical input and the second component of the optical input;
constructing a plurality of additional image frames based on both the first and second components of the optical input without motion compensation;
inserting the additional image frames between the reconstructed image frames according to a local frame rate to generate a local output frame rate greater than a predetermined global frame rate;
keeping the local frame rate of the additional frames around the reconstructed image frame corresponding to the steady image data with low intensity change at the pixel-levels;
increasing the local frame rate of the additional image frames around the reconstructed image frame corresponding to the shaky image data with the high intensity change at the pixel-levels; and
outputting the reconstructed image frames at the predetermined global frame rate and the inserted additional image frames at the local output frame rate to a display device,
wherein a plurality of first type sensor cells of the first type sensor and a plurality of second type sensor cells of the second type sensor are arranged in rows and columns of an array, and the second type sensor cells are divided into red sensors, green sensors and blue sensors, and
wherein in each row comprising the first type sensor cells, the second type sensor cells are free of the blue sensors, and in each column comprising the first type sensor cells, the second type sensor cells are free of the red sensors.

2. The method of claim 1, wherein the first type sensor has a first pixel resolution and a first temporal resolution;
wherein the second type sensor has a second pixel resolution greater than the first pixel resolution and a second temporal resolution less than the first temporal resolution.

3. The method of claim 2, wherein the first type sensor comprises dynamic vision sensor (DVS);
wherein the second type sensor comprises CMOS image sensor (CIS).

4. The method of claim 2, wherein the first type sensor comprises an event-based optical sensor, and the first component of the optical input comprises event-based voxel data;
wherein the second type sensor comprises an frame-based optical sensor, and the second component of the optical input comprises frame-based image data.

5. The method of claim 4, wherein the performing of feature extraction and matching comprises determining, by a motion detection circuit, a motion vector via feature extraction and inter-frame matching on the event-based voxel data.

6. The method of claim 5, wherein the performing of motion compensation comprises generating, by a motion estimation circuit, a motion model based on the motion vector from the feature extraction and matching process.

7. The method of claim 6, wherein the reconstructing of image frame comprising performing, by a frame reconstruction circuit, both spatial synchronization and temporal synchronization of the processed first component and the frame-based second component of the optical input.

8. An image processing apparatus, comprising:
a hybrid image device comprising integrated first type and second type sensors, configured to obtain optical input; and
a processing device in signal communication with the hybrid imaging device, comprising:
a motion detection circuit that connects to the first type sensor of the hybrid imaging device to receive a first component of the optical input corresponding to the first type sensor and performs feature tracking based on the first component of the optical input, and identifies steady image data and shaky image data from the optical input based on intensity change at pixel-levels of the first component of the optical input;
a motion estimation circuit that performs motion compensation on the first component of the optical input based on output of the motion detection circuit;
a frame reconstruction circuit that connects the first type sensor and the second type sensor of the hybrid imaging device to simultaneously receive the first component and a second component of the optical input corresponding to the second type sensor and is configured to:
reconstruct a plurality of image frames based on both output of the motion estimation circuit comprising the motion compensated first component of the optical input and the second component of the optical input;
construct a plurality of additional image frames based on both the first and second components of the optical input without motion compensation;
insert the additional image frames between the reconstructed image frames according to a local frame rate to generate a local output frame rate greater than a predetermined global frame rate;
keep the local frame rate of the additional image frames around the reconstructed image frame corresponding to the steady image data with low intensity change at the pixel-levels; and
increase the local frame rate of the additional image frames around the reconstructed image frame corresponding to the shaky image data with high intensity change at the pixel-levels; and
an output circuit that connects to the frame reconstruction circuit and outputs the reconstructed image frames at the predetermined global frame rate and the inserted additional image frames at the local output frame rate,
wherein a plurality of first type sensor cells of the first type sensor and a plurality of second type sensor cells of the second type sensor are arranged in rows and columns of an array, and the second type sensor cells are divided into red sensors, green sensors and blue sensors, and
wherein in each row comprising the first type sensor cells, the second type sensor cells are free of the blue sensors, and in each column comprising the first type sensor cells, the second type sensor cells are free of the red sensors.

9. The apparatus of claim 8, wherein the frame reconstruction circuit is configured to respectively receive both the first component of the optical input from the first type sensor and the second component of the optical input from the second type sensor.

10. The apparatus of claim 8, wherein the first type sensor has a first pixel resolution and a first temporal resolution;
wherein the second type sensor has a second pixel resolution greater than the first pixel resolution and a second temporal resolution less than the first temporal resolution.

11. The apparatus of claim 10, wherein the second type sensor cell is a CMOS image sensor (CIS) cell; and
wherein the first type sensor cell is a dynamic vision sensor (DVS) cell.

12. The apparatus of claim 11, wherein the first type sensor comprises an event-based optical sensor, and the first component of the optical input comprises event-based voxel data;
wherein the second type sensor comprises an frame-based optical sensor, and the second component of the optical input comprises frame-based image data.

13. The apparatus of claim 12, wherein the motion detection unit is configured to determine a motion vector via feature extraction and inter-frame analysis on the event-based voxel data; and
wherein the motion estimation unit is configured to generate a motion model based on the motion vector.

14. The apparatus of claim 13, wherein the frame reconstruction circuit is configured to perform both pixel synchronization and temporal synchronization between the event-based first component and the frame-based second component of the optical input.

15. An image processing system, comprising:
an image signal processor (ISP) configured to simultaneously receive a first component and a second component of an optical input from a hybrid imaging device comprising a first type sensor and a second type sensor, wherein the first component comprises event-based voxel data and the second component comprises frame-based image data, and the first component corresponds to the first type sensor and the second component corresponds to the second type sensor; and a memory coupled to the ISP comprising instructions that, when executed by the ISP, causing the ISP to:

perform feature tracking based on the first component of the optical input, and identify steady image data and shaky image data from the optical input based on intensity change at pixel-levels of the first component of the optical input;

perform motion compensation of the first component of the optical input;

reconstruct a plurality of image frames based on both the motion compensated first component of the optical input and the second component of the optical input;

construct a plurality of additional image frames based on both the first and second components of the optical input without motion compensation;

inserting the additional image frames between the reconstructed image frames according to a local frame rate to generate a local output frame rate greater than a predetermined global frame rate;

keeping the local frame rate of the additional image frames around the reconstructed image frame corresponding to the steady image data with low intensity change at the pixel-levels;

increasing the local frame rate of the additional image frames around the reconstructed image frame corresponding to the shaky image data with high intensity change at the pixel-levels; and output the reconstructed image frames at the predetermined global frame rate and the inserted additional image frames at the local output frame rate to a display device, wherein a plurality of first type sensor cells of the first type sensor and a plurality of second type sensor cells of the second type sensor are arranged in rows and columns of an array, and the second type sensor cells are divided into red sensors, green sensors and blue sensors, and wherein in each row comprising the first type sensor cells, the second type sensor cells are free of the blue sensors, and in each column comprising the first type sensor cells, the second type sensor cells are free of the red sensors.

16. The system of claim 15, wherein the ISP is configured to perform image frame reconstruction by synchronizing the first component of the optical input from the first type sensor and the second component of the optical input from the second type sensor.

17. An image processing apparatus, comprising:

a hybrid imaging device comprising integrated first type and second type sensors, configured to obtain optical input; and a processing device in signal communication with the hybrid imaging device, comprising:

a motion detection circuit that connects to the first type sensor of the hybrid imaging device to receive a first component of the optical input corresponding to the first type sensor and performs feature tracking based on the first component of the optical input, wherein the feature tracking is performed to find a plurality of features in the first component, and each of the features is identified as a set of dots in a frame of the first component that form a particular shape, wherein a correspondence of the features between two successive frames of the first components are transformed to a motion model;

a motion estimation circuit that performs motion compensation of the first component of the optical input based on the motion model from the motion detection circuit without a second component of the optical input corresponding to the second type sensor;

a frame reconstruction circuit that connects the first type sensor and the second type sensor of the hybrid imaging device to simultaneously receive the first component and the second component of the optical input corresponding to the second type sensor and reconstructs a plurality of image frames based on both output of the motion estimation circuit comprising the motion compensated first component of the optical input and the second component of the optical input, and constructs a plurality of additional image frames based on both the first and second components of the optical input without motion compensation; and an output circuit that outputs the reconstructed image frames at a predetermined global frame rate and the additional image frames inserted between the reconstructed image frames at a local output frame rate greater than the predetermined global frame rate, wherein a plurality of first type sensor cells of the first type sensor and a plurality of second type sensor cells of the second type sensor are arranged in rows and columns of an array, and the second type sensor cells are divided into red sensors, green sensors and blue sensors, and wherein in each row comprising the first type sensor cells, the second type sensor cells are free of the blue sensors, and in each column comprising the first type sensor cells, the second type sensor cells are free of the red sensors.

* * * * *